Figure 1:
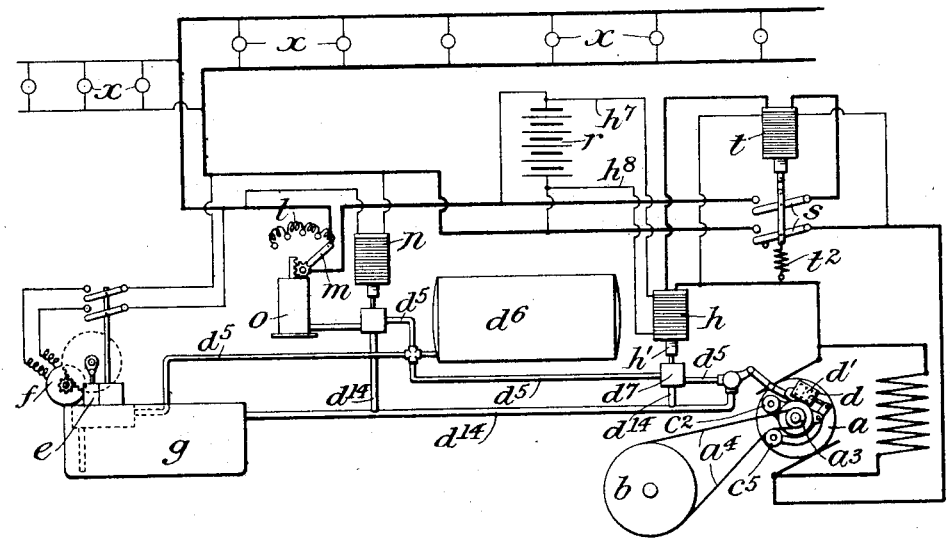

No. 750,549. PATENTED JAN. 26, 1904.
L. LYNDON.
SYSTEM OF ELECTRICAL GENERATION, DISTRIBUTION, AND CONTROL.
APPLICATION FILED JAN. 22, 1903. RENEWED DEC. 8, 1903.
NO MODEL.

Attest:
A. N. Jesbera
E. M. Taylor

Inventor:
Lamar Lyndon
by Redding, Kiddle & Greeley
Attys.

No. 750,549.

Patented January 26, 1904.

UNITED STATES PATENT OFFICE.

LAMAR LYNDON, OF NEW YORK, N. Y., ASSIGNOR TO NATIONAL BATTERY COMPANY, OF JERSEY CITY, NEW JERSEY, AND BUFFALO, NEW YORK, A CORPORATION OF NEW JERSEY.

SYSTEM OF ELECTRICAL GENERATION, DISTRIBUTION, AND CONTROL.

SPECIFICATION forming part of Letters Patent No. 750,549, dated January 26, 1904.

Application filed January 22, 1903. Renewed December 8, 1903. Serial No. 184,361. (No model.)

*To all whom it may concern:*

Be it known that I, LAMAR LYNDON, a citizen of the United States, residing in the borough of Manhattan, in the city of New York, in the State of New York, have invented certain new and useful Improvements in Systems of Electrical Generation, Distribution, and Control, of which the following is a specification, reference being had to the accompanying drawings, forming a part hereof.

This invention relates to systems and apparatus for the generation and distribution and control of electric current, such as are shown and described in the application of Elmer A. Sperry for Letters Patent of the United States, Serial No. 134,035, filed December 5, 1902, and in the application of Elmer A. Sperry and for Letters Patent of the United States, Serial No. 139,399, filed January 17, 1903, and particularly to the control of the generator and the storage battery.

The object particularly in view is to provide for an increase in the voltage of the generator while the accumulator is being charged, so that the voltage of the accumulator can be increased substantially to the maximum possible voltage. To accomplish this result, provision is made whereby the rate of increase of the magnetic pull of the electromagnetic device, by which the speed of the generator is controlled, as such magnetic pull approaches the degree necessary to reduce the speed of the generator shall be reduced through the gradually-increasing voltage of the accumulator, whereby the reduction of the speed of the generator is deferred until the voltage of the accumulator reaches substantially its maximum.

The invention will be more fully described and explained hereinafter with reference to the accompanying drawings, in which it is illustrated and in which, as far as possible, the same reference characters are employed to designate like parts as in said application.

Figure 2:
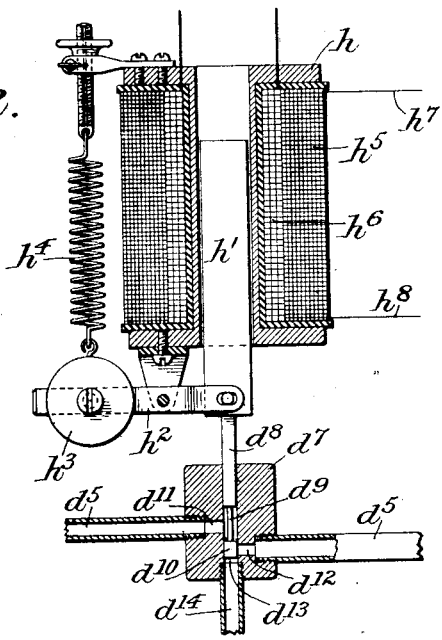

In the drawings, Figure 1 is a diagrammatic view illustrating the general relation of the several mechanical and electrical elements of the system. Fig. 2 is a detail view, in vertical section, of the electromagnetic device and the valve operated thereby for controlling the speed of the generator.

The entire system to which the present invention may be applied will be described herein so far as may be necessary to enable the present invention to be understood.

Reference may be had to the applications above mentioned for a detailed description of the several parts of the system, both electrical and mechanical, so far as they are not directly involved in the present invention. The generator $a$ may be of any suitable construction and may be arranged to be driven by a belt $a^4$ from the driving-wheel $b$, which may be, as in the applications above referred to, a wheel mounted on the axle of a railway-car. The frictional engagement of the belt with the driven pulley $a^3$, and therefore the speed of the generator, may be controlled by a belt-tightener, which may be of any suitable construction and is sufficiently represented at $c^2$ and $c^5$, the movable part of the belt-tightener being actuated, in the arrangement represented in the drawings, by fluid-pressure acting through a cylinder $d$. A suitable system of pipes $d^5$ and $d^{14}$, with a pressure-reservoir $d^6$ in connection therewith, is provided for the delivery of the fluid under pressure to the cylinder $d$ and the return of the fluid to its source of supply, which may be a pump $e$, driven by a motor $f$ in circuit with the generator, or, rather, with the storage battery hereinafter referred to. An electromagnetic device (represented at $h$) is provided for the control of the pressure in the cylinder $d$, and therefore for the control, through the medium of the belt-tightener or other device, of the speed of the generator. This electromagnetic device is shown as a solenoid, the windings of which are in circuit, as hereinafter described. The core $h'$ is statically balanced, being connected by a lever $h^2$ with a counterweight $h^3$ and with an adjustable spring $h^4$, which opposes the pull of the solenoid upon the core. The core of the solenoid controls a valve $d^7$, interposed in the pipe system, by means of which the admission of oil to the cylinder $d$ is regulated and by which the oil in the cylinder may be in part released and permitted to return to the oil-pan $g$, so that the belt may slacken. As shown, the valve comprises a plug or stem $d^8$, turned down, as at $d^9$, to form a passage between the head $d^{10}$ and the body of the valve. The valve-chamber has a port $d^{11}$, communicating with the pressure-tank, a port $d^{12}$, communicating with the cylinder $d$, and a port $d^{13}$, communicating with the oil-pan $g$ through a return-pipe $d^{14}$. The valve is shown in its normal position, the port $d^{12}$ being closed. If the magnetic pull of the solenoid increases, the core will be raised against the tension of the spring $h^4$, so that the head $d^{10}$ of the valve will be moved to establish connection between the port $d^{12}$ and the port $d^{13}$, thereby relieving the pressure behind the piston $d'$ in the cylinder $d$ and permitting the belt to slacken, and therefore to slip, whereby the speed of the dynamo is reduced. On the other hand, if the magnetic pull of the solenoid decreases the spring $h^4$ will draw down the core $h'$, thereby moving the valve-plug to establish communication through the channel $d^9$ between the ports $d^{11}$ and $d^{12}$, thereby permitting more oil to pass into the cylinder $d$, whereby the belt is tightened and the speed of the dynamo is increased.

The ordinary fine-wire winding $h^5$ of the solenoid $h$ is connected by wires $h^7$ $h^8$ with the terminals of the storage battery $r$, which is in parallel circuit with the generator, bridged on the main circuit between the generator and the translating device, (indicated at $x$,) a switch $s$ being interposed between the generator and the battery for the purpose of opening the circuit between the generator and the battery when necessary. The coarse-wire windings $h^6$ of the solenoid are arranged to assist the fine-wire windings and are connected in series with the armature-winding of the generator, so that the assisting power of the series winding will be an inverse function of the pressure at the battery-terminals. Since the magnetic pull of the solenoid which is necessary for a given tightening effect of the belt is a constant and is equal to the sum of the magnetic pulls produced by the two windings of the solenoid and the magnetic pull or assistance produced by the series winding, as already stated, is an inverse function of the pressure at the battery-terminals, it is evident that this constant is approached more slowly as the voltage of the battery increases, so that the time when the tension of the spring $h^4$ is overcome and the speed of the generator is reduced through the slackening of the belt will be deferred until the voltage of the battery has been increased so much as to make the sum of the influences of the two windings of the solenoid equal the constant, which is necessary to bring about the slackening of the belt. In this manner the reduction of the speed of the generator is deferred from the time when the voltage of the battery reaches, say, two volts per cell until the time when the voltage of the battery reaches, say, 2.45 volts per cell, thus permitting the charging of the battery to continue until the voltage is considerably higher than would otherwise be possible.

It will be understood that an automatic resistance device, such as the rheostat $l$ $m$, operated by oil-pressure in the cylinder $o$ under the control of an electromagnetic device $n$ in circuit with the lamps or other translating devices $x$, is provided for the purpose of maintaining a current of substantially uniform voltage through the translating devices, the same being preferably arranged as shown in the applications above mentioned.

The switch $s$, to cut out the generator when it is running at low speed, is arranged substantially as described in said application, the electromagnetic device to control the switch being represented in this instance as a solenoid $t$, having two windings—a coarse winding and a fine winding—substantially as shown in Fig. 2. The fine winding is included in a shunt from the main circuit, as indicated in Fig. 1, and normally holds up the core of the solenoid against the tension of the spring $t^2$. The coarse winding of the solenoid, also as indicated in Fig. 1, is included in one leg of the main circuit in series with one of the switch members, the coarse winding being in the same direction as the fine winding. The operation of this device is the same as that of the differential magnet shown in the applications above mentioned, the rush of current backward through the coarse winding when the electromotive force of the battery exceeds that of the generator neutralizing the effect of the fine winding and permitting the core of the solenoid to drop and the switch to open. When the electromotive force of the generator increases sufficiently, the current through the fine-wire winding will cause the core of the solenoid to be drawn against the tension of the spring $t^2$ and the switch to be closed.

I claim as my invention—

1. The combination of a generator, driving means, controlling devices for said driving means, translating devices in circuit with the generator, an accumulator in parallel circuit with the generator and an electromagnetic device to actuate said controlling devices, said electromagnet device having a fine-wire winding connected with the terminals of the accumulator and a coarse-wire winding in series with the generator.

2. In combination with a generator, driving means, controlling devices for said driving means, translating devices in circuit with the generator, an accumulator in parallel circuit with the generator, and an electromagnetic device to actuate said controlling devices, said electromagnetic device having a fine-wire winding connected with the terminals of the accumulator and a coarse-wire winding in series with one side of the generator between it and the translating devices.

3. The combination of a generator, driving means, controlling devices for said driving means, translating devices in circuit with the generator, an accumulator in parallel circuit with the generator, a cut-out switch between the generator and the accumulator, an electromagnetic device to control said switch and an electromagnetic device to actuate said controlling devices, said last-named electromagnetic device having a fine-wire winding connected with the terminals of the accumulator and a coarse-wire winding in series with the generator and the first-named electromagnetic device.

4. The combination of a generator, driving means, controlling devices for said driving means, translating devices in circuit with the generator, an accumulator in parallel circuit with the generator, a cut-out switch between the generator and the accumulator, an electromagnetic device to control said switch and having one winding in a shunt from the main circuit and another winding in series in one leg of the main circuit, and an electromagnetic device to actuate said controlling devices, said last-named electromagnetic device having a fine-wire winding connected with the terminals of the accumulator and a coarse-wire winding in series with the generator.

This specification signed and witnessed this 15th day of January, A. D. 1903.

LAMAR LYNDON.

In presence of
 LUCIUS E. VARNEY,
 ROSWELL S. NICHOLS.